United States Patent [19]

Waggoner

[11] 4,042,505
[45] Aug. 16, 1977

[54] FILTER ARRANGEMENT WITH BAFFLES

[75] Inventor: John B. Waggoner, Joliet, Ill.

[73] Assignee: Caterpillar Tractor Co., Peoria, Ill.

[21] Appl. No.: 719,005

[22] Filed: Aug. 30, 1976

[51] Int. Cl.$^2$ .................... B01D 27/10; E03B 11/00
[52] U.S. Cl. .................................. 210/132; 210/172; 210/305
[58] Field of Search ............... 210/132, 172, 314, 232, 210/323, 335, 340, 345, 443, 446, 305; 137/454.6

[56] References Cited

U.S. PATENT DOCUMENTS

| | | | |
|---|---|---|---|
| 2,220,706 | 11/1940 | Cantin | 210/132 X |
| 3,161,589 | 12/1964 | Burckhaltzer | 210/232 |
| 3,214,023 | 10/1965 | Donner | 210/172 |
| 3,269,540 | 8/1966 | Rosaen | 210/172 |
| 3,295,680 | 1/1967 | Wilber | 210/172 |
| 3,486,622 | 12/1969 | Rosaen et al. | 210/172 X |
| 3,928,201 | 12/1975 | Junck et al. | 210/132 |
| 3,959,141 | 5/1976 | Johnson | 210/172 |

*Primary Examiner*—Theodore A. Granger
*Attorney, Agent, or Firm*—Phillips, Moore, Weissenberger, Lempio & Majestic

[57] ABSTRACT

The invention is concerned with an improvement in a hydraulic reservoir which comprises a tank having internally thereof filter means attached longitudinally between a first and a second generally parallel side thereof, said filter means including generally tubular filter element means extending generally longitudinally between said first and second sides of said tank and means for introducing a hydraulic fluid from an exterior of said tank to an interior of said element means from adjacent said first side of said tank. The improvement of the invention comprises a tube within said tank surrounding said element means and extending longitudinally generally the length thereof, said tube including exit means therethrough through which said hydraulic fluid passes after passage thereof from the interior to an exterior of said element means, a first end of said tube sealing adjacent said second side of said tank and a second end of said tube sealing adjacent said first side of said tank. Also a part of the improvement of the invention is baffle means within said tank arranged to receive generally all of said hydraulic fluid which passes through said exit means, said baffle means conducting said hydraulic fluid to below fluid level in said reservoir and having egress means therefrom wholly below said normal fluid level.

5 Claims, 7 Drawing Figures

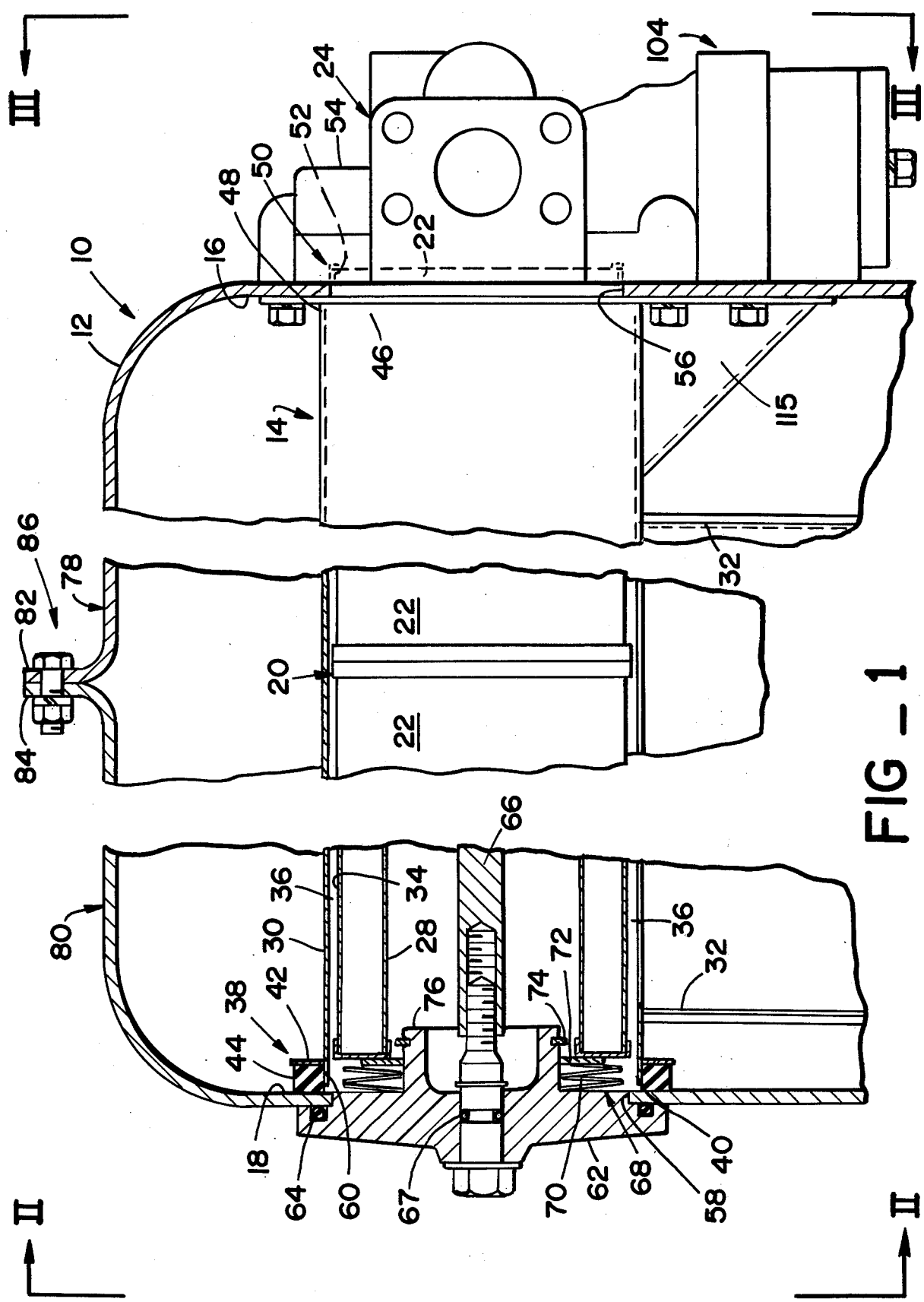

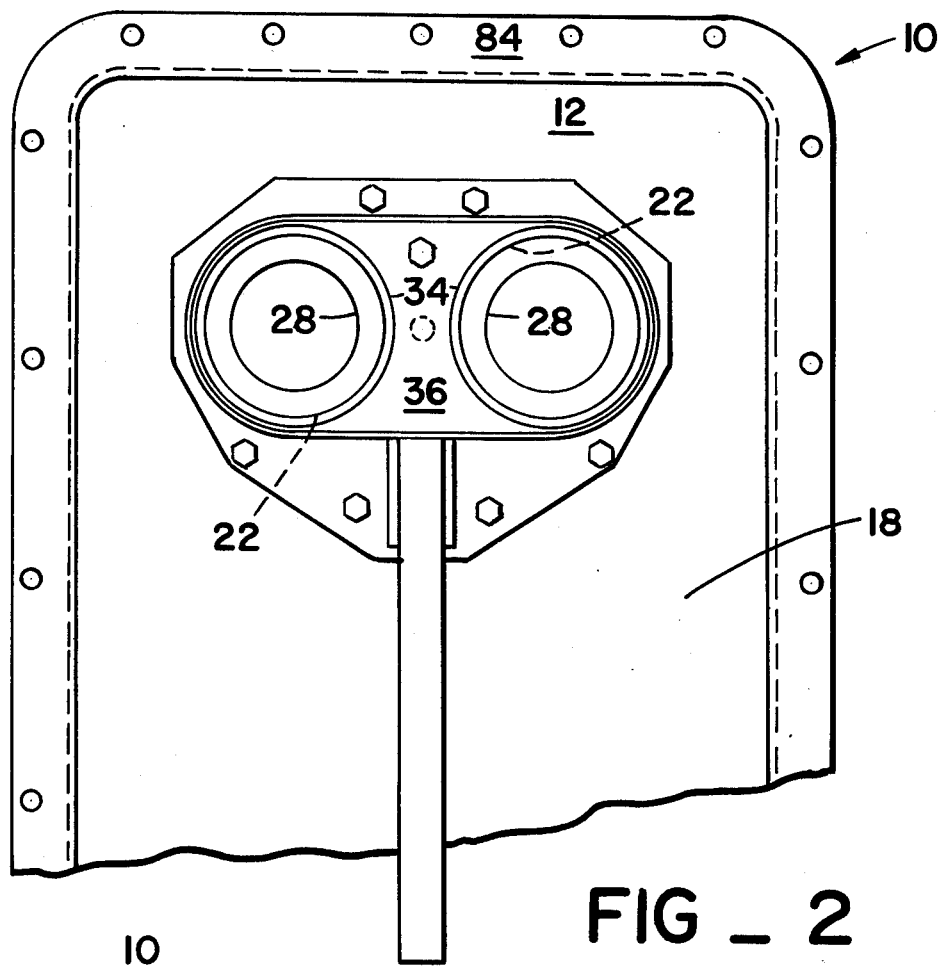
FIG_2
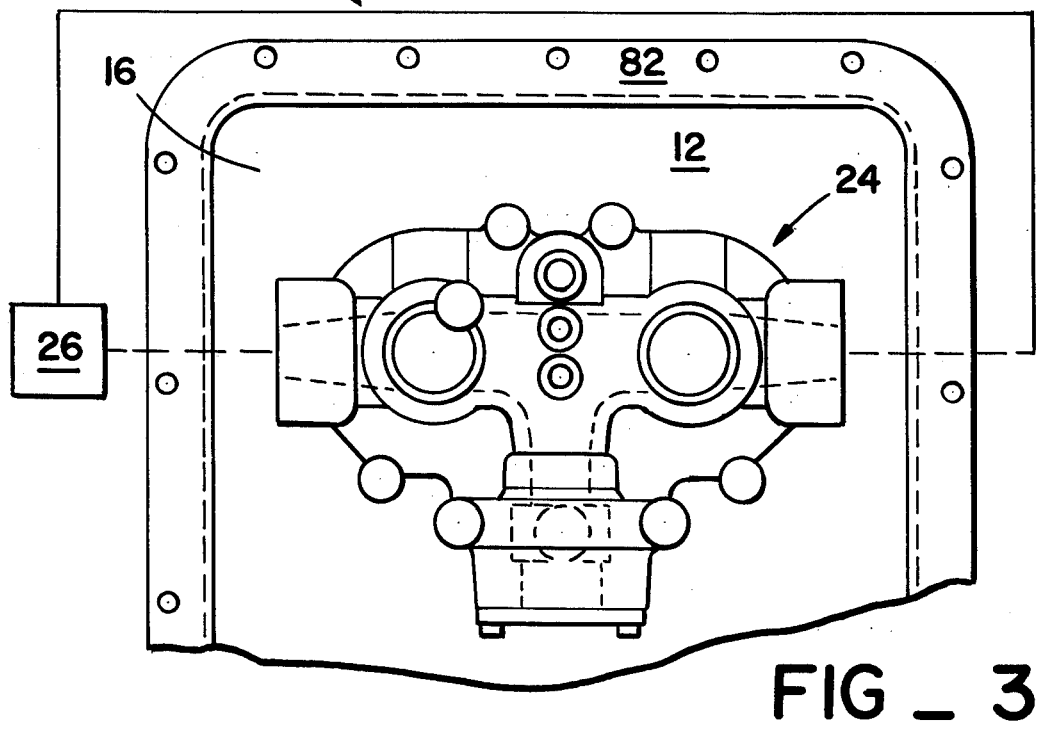
FIG_3

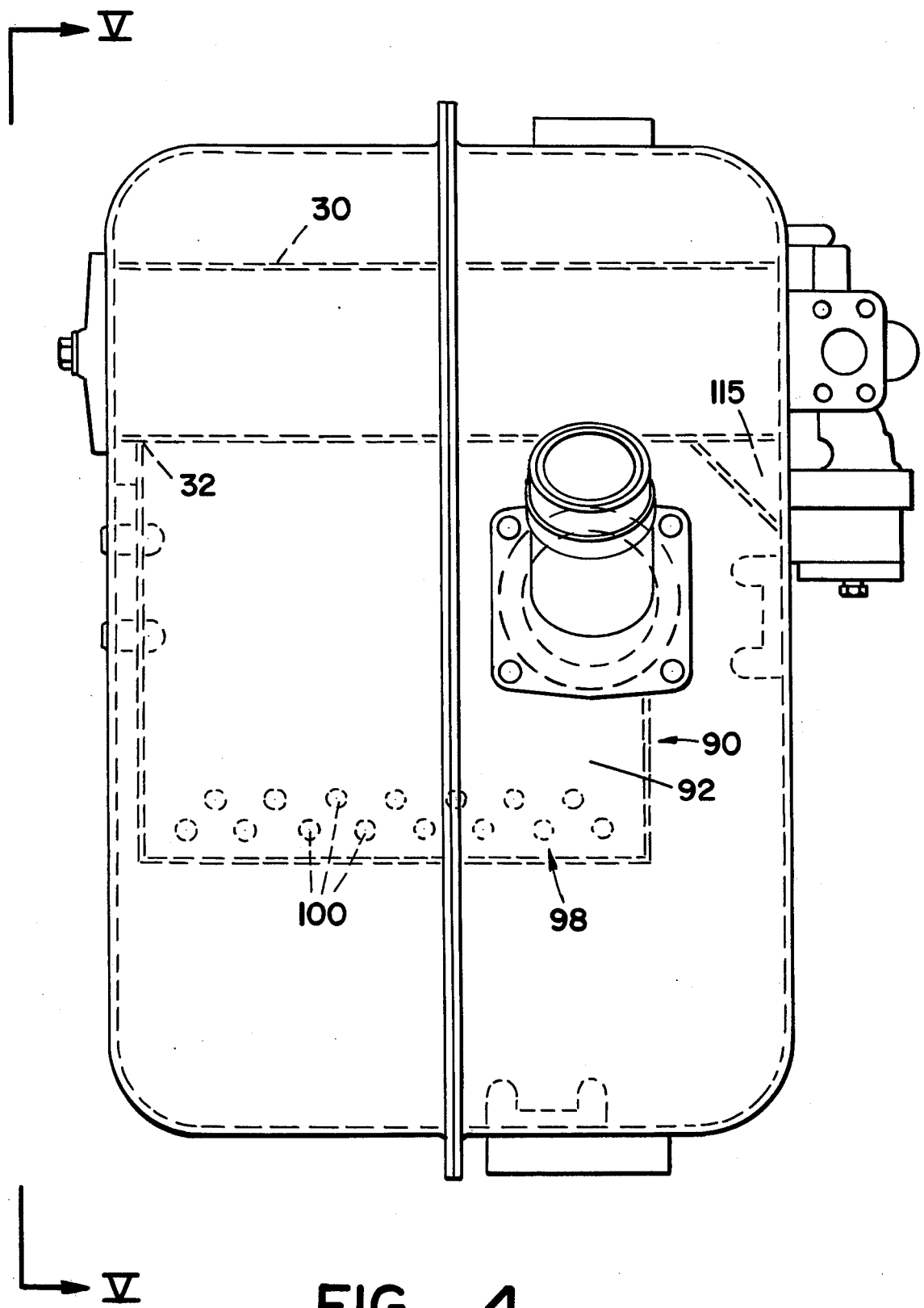
FIG _ 4

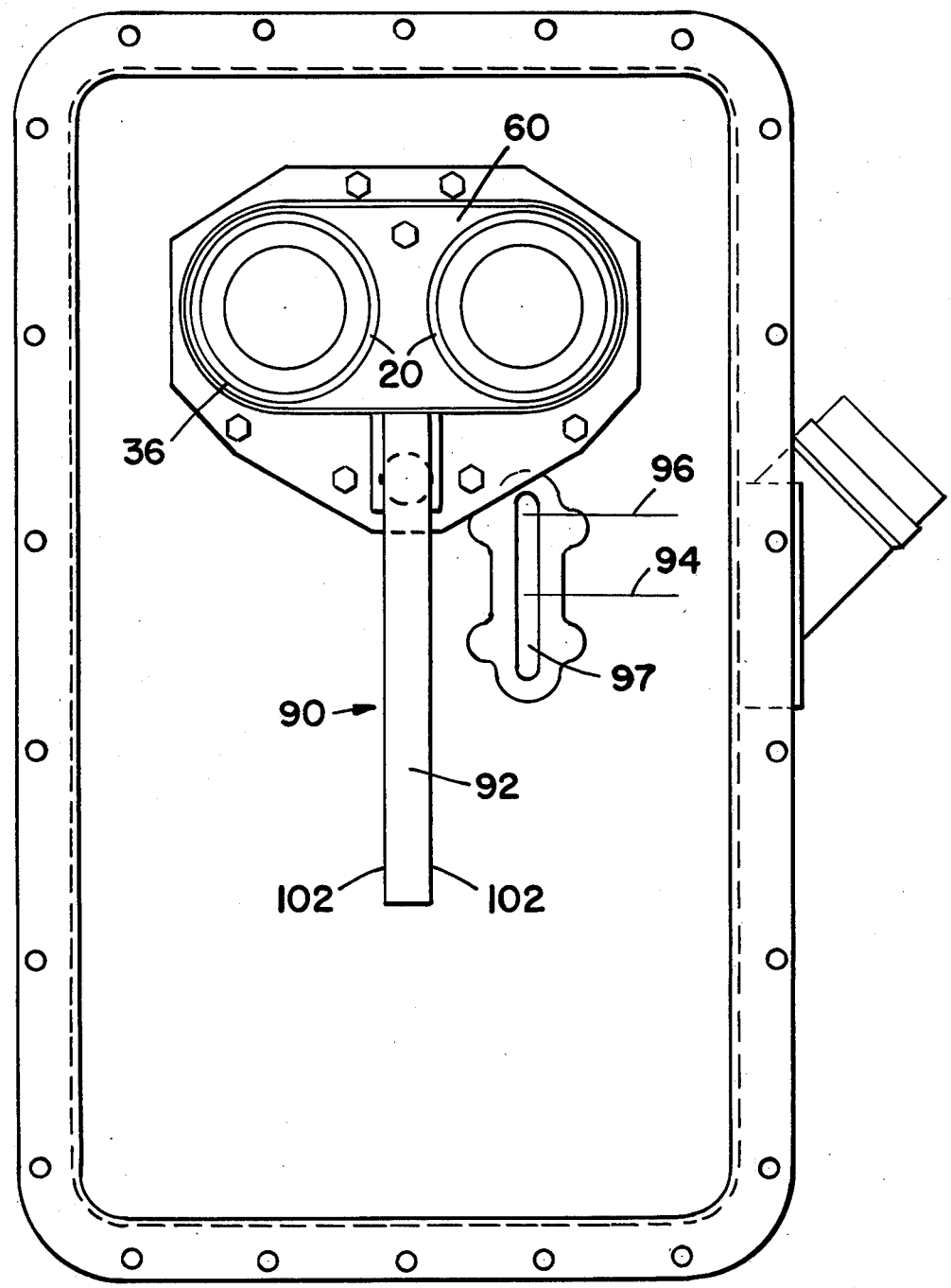
FIG_5

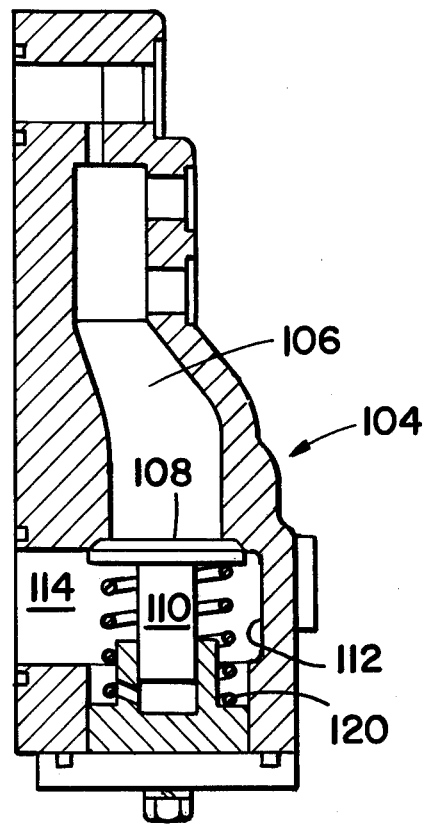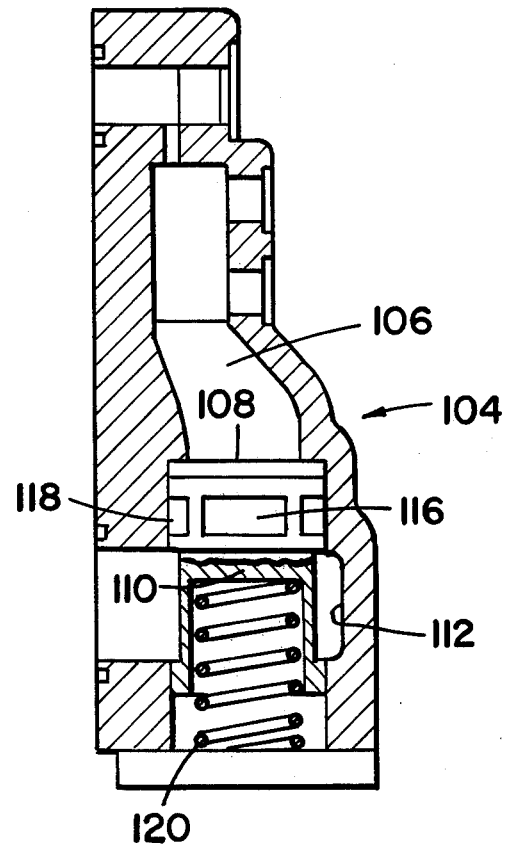
FIG_6    FIG_7

FILTER ARRANGEMENT WITH BAFFLES

BACKGROUND OF THE INVENTION

1. Field of the Invention

The invention is concerned with an improved filter means internal of a hydraulic reservoir, which filter means includes baffle means which directs fluid from said filter means to egress into the reservoir only below a normal fluid level therewithin.

2. Prior Art

The prior art has primarily been concerned with filter elements which are of the spin on or thread on type and are attachable externally of a hydraulic system which contains a hydraulic fluid. Generally, flow is provided of the hydraulic fluid through such a filter element and then from that filter element to a sump or other hydraulic reservoir of the system. A typical prior art external filter element of this nature is disclosed for example in U.S. Pat. No. 3,685,658. Some prior art filter assemble of this nature have provided bypass flow which takesover in case of a clogging of the filter element. U.S. Pat. No. 3,374,892 for example discloses such a felter assembly. Some filter elements are also used within hydraulic reservoirs such as those disclosed in for example U.S. Pats. Nos. 3,0886,072 and 3,900,400 but these are of considerably different structure, operation and mounting than are the structures of the present invention.

It can be very desirable to place filter means for a hydraulic system within a hydraulic reservoir of the system so as to obtain more resistance to flow, protection of the filter elements from damage from external sources and the like. However, with such an internal filter means it has been found that it is necessary to ensure that excessive foaming of the hydraulic fluid does not occur as this fluid leaves the filter means and is introduced into the interior of the hydraulic reservoir. The present invention provides just such an internal filter means wherein foaming is prevented and, further, in preferred embodiments of the invention provides bypass valve means whereby hydraulic fluid is introduced to the reservoir generally via the filter means when the filter elements themselves are partially or completely clogged, which bypass valve directs the bypassing hydraulic fluid to be introduced in such a manner that foaming does not occur within the reservoir. These and other advantages of the invention as will become apparent by reading the following specification are accomplished as set out herein.

SUMMARY OF THE INVENTION

The invention relates to an improvement in a hydraulic reservoir which comprises a tank having internally thereof filter means attached longitudinally beeweem a first and a second generally parallel side thereof, said filter means including generally tubular filter element means extending generally longitudinally between said first and second side of said tank and means for introducing a hydraulic fluid from an exterior of said tank to an interior of said element means from adjacent said first side of said tank. The improvement of the invention comprises a tube within said tank surrounding said element means and extending longitudinally generally the length thereof, said tube including exit means therethrough through which said hydraulic fluid passes after passage thereof from the interior to an exterior of said element means, a first end of said tube sealing adjacent said second side of said tank and a second end of said tube sealing adjacent said first side of said tank. Also part of the improvement of the invention is baffle means within said tank arranged to receive generally all of said hydraulic fluid which passes through said exit means, said baffle means conducting said hydraulic fluid to below a normal fluid level in said reservoir and having egress means therefrom only below said normal fluid level.

BRIEF DESCRIPTION OF THE DRAWINGS

The invention will be better understood by reference to the figures of the drawings wherein like numbers denote like parts throughout and wherein:

FIG. 1 comprises a partial side section view of a hydraulic reservoir including the improvement of the present invention;

FIG. 2 comprises a view taken along the line II—II of FIG. 1; and

FIG. 3 comprises a view taken along the line III—III of FIG. 1; and

FIG. 4 illustrates an inside elevation of the improvement of the present invention;

FIG. 5 illustrates a view taken along the line V—V of FIG. 4;

FIG. 6 illustrates bypass valve means useful in the improvement of the present invention; and FIG. 7 illustrates alternate bypass valve means to that illustrated in FIG. 6.

DETAILED DESCRIPTION OF THE PREFERRED EMBODIMENTS

Turning first ot FIG. 1 there is illustrated therein a hydraulic reservoir 10 which comprises a tank 12 having internally thereof filter means 14 attached longitudinally between a first side 16 and a second generally parallel side 18 of the tank 12. The filter means 14 includes generally tubular filter element means 20 which in the particular embodiment illustrated comprises four filter elements 22 which are shown most clearly in FIGS. 1 and 2. Hydraulic fluid introducing means 24 shown most clearly in FIGS. 1 and 3 provide means for introducing a hydraulic fluid from an exterior of the tank, generally from a hydraulic system 26 as illustrated schematically in FIG. 3 to an interior 28 of the filter element 20 from adjacent the first side 16 of the tank 12.

The invention is particularly concerned with a tube within the tank 12 which surrounds the filter element means 20 and extends longitudinally generally the length of said filter element means 20. The tube 30 includes exit means 32 therefrom generally from the bottom thereof through which the hydraulic fluid passes after passage of the hydraulic fluid from the interior 28 of the filter element means 20 to an exterior 34 of the filter element means 20. More particularly the exit means 32 leads from a chamber 36 formed between the filter element means 20 and the tube generally to the inside of the hydraulic reservoir 10. The exit means 32 generally forms the exclusive exit from the tube 30.

The tube is compressibly sealed by compressible sealing means 38 in such a manner that a first end 40 of the tube 30 is held adjacent the second side 18 of the tank 12. The compressible sealing means of the present invention preferably comprises a flange 42 which extends peripherally outwardly from the tube 30 adjacent the first end 40 thereof and a compressible elastomeric gasket 44 which is compressed between the flange 42 and the second side 18 of the tank 12.

The improvement of the present invention preferably includes rigid attaching means 46 for rigidly attaching a second end 48 of the tube 30 adjacent the first side 16 of the tank 12. Holding means 50 for the filter element means 20 also preferably form a part of the improvement of the present invention. The holding means can simply comprise a pilot 52 in a port closure means 54 which covers a port 56 in the first side 16 of the tank 12. Two of the four filter elements 22, one of which is shown in FIG. 1, are thus rigidly held by the pilot 52.

An opening 58 through the second side 18 of the tank 12 provides access to an interior 60 of the tube 30 adjacent the first end 40 thereof. The opening 58 is sized to allow entry of the filter element means 20 and more particularly of the four filter elements 22 to the interior 60 of the tube 30. Cover means 62 is provided which is ealingly attachable, as for example by using a seal ring 64, over the opening 58. The cover means 62 is attacheble longitudinally through the tube 30 to adjacent the first side 16 of the tank 12 and more specifically is attachable to the port closure means 54 as by being screwed into the port closure means 54 via an elongated bolt means 66. The bolt means 66 pass through the cover means 62 and are sealed thereto by a seal ring 67.

Compressible positioning means 68, in the embodiment illustrated a plurality of axially compressible resilient washers 70 which bear against a retaining washer 72 sreve to compressibly hold the filter element means 20 between the first side 16 and the second side 18 of the tank 12. A retaining ring 74 generally serves to hold the plurality of resilient washers 70 and the retaining washer 72 from escaping from an extension 76 which extends from the cover 62 towards the first side 16 of the tank 12.

The tank 12 of the preferred embodiment includes means for disassembling it into a first part 78 which includes the first side 16 as part thereof and a second part 80 which includes the second side 18 of the tank 12 as a part thereof. The disassembling means for the tank generally includes the pair of flanges 82 and 84 extending respectively from the first part 78 and the second part 80 of the tank 12 and a plurality of bolt-nut means 86 fastening the first flange 82 to the second flange 84. Because of this disassembleability of the tank 12, the tube 30 can be readily placed therewithin and the port closure means 54 can be attached from the interior of the tank 12 when the first part 78 thereof is separated from the second part 80 thereof. After the tube 30 has been attached to the first part 78 and more particularly to the first side 16 of the tank 12, the gasket 44 can be put in place adjacent the flange 42 and the bolt-nut means 86 can be fastened in place. The filter element means 20 can be put in place either when the tank 12 is disassembled into the first part 78 and the second part 80 thereof or can be put in place through the opening 58 before or after removal of the cover 62.

Referring now most particularly to FIGS. 4 and 5 there is illustrated therein baffle means 90 which extends generally downwardly from the exit means 32 of the tube 30. Further, the exit means 32 of the tube 30 forms the exclusive exit therefrom. The baffle means 90 which in the embodiment illustrated comprises a hollow flattened tubular member 92 serves to conduct fluid from the exit means 32 of the tube 30 to below a normal liquid level located beneath the tube 30 and generally falling between a fill level 94 and a full level 96 indicated on a sight gauge 97. The baffle means 90 includes egress means 98, generally a plurality of holes 100, which egress means 98 is below said normal fluid level. Thus, the egress means 98 or more particularly the plurality of holes 100 is normally below the fill level 94 within the tank 12. Generally, the holes 100 are placed in the sides 102 of the flattened tubular member 92 whereby fluid leaves the plurality of holes 100 generally perpendicularly to it's direction of flow within the flattened tubular member 92 thus leading generally to a smooth and even introduction of hydraulic fluid into the interior of the tank 12.

Because of the spaced arrangement of the filter arrangement of the filter element means 20 from the interior 60 of the tube 30 the chamber 36 is defined therebetween. This chamber 36 serves a very important function in providing fluid flow into the hydraulic reservoir 10 even when the filter element means 20 are obstructed as by being filled with dirt or the like. In particular, bypass valve means 104 seen most clearly in FIGS. 1 and 6 and shown in an alternate embodiment in FIG. 7 is provided in flow communication with the hydraulic system 26 from which hydraulic fluid is introduced via the hydraulic fluid introducing means 24 to the interior 28 of the filter element means 20. A pressure sensed by the bypass valve means 104 as via a passage 106 which applies pressure to a top 108 of a spool 110 leads to the spool 110 being forced downwardly whereby fluid flow can occur about an annulus 112 and thence via a bore 114 and a passage 115 to the chamber 36. The fluid from the chamber 36 then flows in the same manner as it would have flowed through the filter element means 20. In other words, the fluid from the chamber 36 then flows into the baffle means 90 and is released via the egress means 98 below the normal liquid level and generally below the fill level 94 of the tank 12.

In the alternate embodiment of the bypass valve means 104 as illustrated in FIG. 7 a pressure is still applied in the same manner via the passage 106 to the top 108 of the spool 110. In this embodiment, however, the fluid flows into a well 116 in the spool 110 and flows from the well 116 via a plurality of passages 118 and thence to the annulus 112. In this arrangement, the flow through the bypass valve means 104 is modulated by the plurality of passages 118.

It is clear that in both embodiments of the bypass valve means 104 of the present invention the pressure sensed by the bypass valve means 104, i.e., the pressure in the passage 106, is proportional to a pressure of hydraulic fluid at the interior 28, of the filter element means 20. Thus, as the pressure within the interior 28 of the filter element means 20 builds up due to clogging of the filter element means 20 as it becomes dirty with particulate matter brought to it from the hydraulic system 26, the pressure at the top 108 of the spool 110 will become sufficient to overcome biasing means, generally spring means such as a spring 120 which biases the bypass valve means 104 into a closed position. The pressure value within the interior 28 of the filter element means 20 which is sufficient to move the spool 110 of the bypass valve means 104 is thus a value predetermined by the strength of the spring 120 or other biasing means used in place thereof. The compressible positioning means 68 acts in concert with the bypass valve means 104 by assuring that the interior 28 of the filter element means 20 has no other escape route to the interior of the tank 12.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a hydraulic reservoir which comprises a tank having internally thereof filter means attached longitudinally between a first and a second generally parallel side thereof, said filter means including generally tubular filter element means extending generally longitudinally between said first and second sides of said tank and means for introducing a hydraulic fluid from an exterior of said tank to an interior of said element means from adjacent said first side of said tank, an improvement comprising:
   a tube within said tank in an upper portion thereof surrounding said element means and extending longitudinally generally the length thereof, said tube including exit means therethrough through which said hydraulic fluid passes into said reservoir after passage thereof from the interior to an exterior of said element means, a first end of said tube sealing adjacent said second side of said tank and a second end of said tube sealing adjacent said first side of said tank; and
   first conduit means with a first open end surrounding said exit means and in fluid communication therewith, and a second end located in a lower portion of said reservoir, said second end having egress means therefrom to said reservoir lower portion.

2. An improvement as in claim 1, wherein said tube is locaated a spaced distance from said element means to define a chamber therebetween and including:
   bypass valve means in flow communication with a hydraulic system from which hydraulic fluid is introduced via said hydraulic fluid introducing means to an interior of said element means, a pressure sensed by said bypass valve means being proportional to a pressure of hydraulic fluid interior of said element means, said bypass valve means including biasing means biasing it into a closed position until said pressure interior of said element means reaches a value predetermined by the strength of said biasing means, said bypass valve means assuming an open position to allow said hydraulic fluid to flow therethrough when said pressure interior of said element means reaches and exceeds said predetermined value; and
   second conduit means arranged to conduct said hydraulic fluid from said bypass valve means when it is in said open position to said chamber.

3. An improvement as in claim 2, wherein said first side of said tank includes a port therethrough in alignment with said second end of said tube and including:
   port closure means sealingly attachable over said port,
   and wherein said bypass valve means is integral with said port closure means.

4. An improvement as in claim 3, wherein said bypass valve means includes hydraulic fluid flow modulating means.

5. An improvement as in claim 4, wherein said tank has an opening through said second side thereof to an interior of said tube adjacent said first end thereof sized to allow entry of said element means to the interior of said tube and including:
   cover means sealingly attachable over said opening by rod means attached longitudinally through said tube to said first side of said tank;
   a collar generally coaxially surrounding said rod means and extending from said cover means towards said first side of said tank within said tube; and
   compressible spring means surrounding said collar and compressing said element means towards said first side of said tank.

* * * * *